UNITED STATES

251,608

LLEWELLYN L. LEATHERS, OF WASHINGTON, DISTRICT OF COLUMBIA.

COMPOUND FOR THE MANUFACTURE OF ARTIFICIAL STONE.

SPECIFICATION forming part of Letters Patent No. 251,608, dated December 27, 1881.

Application filed December 6, 1881. (No specimens.)

*To all whom it may concern:*

Be it known that I, LLEWELLYN L. LEATHERS, of Washington, in the county of Washington, District of Columbia, have invented certain new and useful Improvements in Compounds for Manufacture of Artificial Stone, Marble, Tiles, &c.; and I do hereby declare that the following is a full, clear, and exact description thereof, reference being had to the accompanying drawings, and to the letters of reference marked thereon, making a part of this specification.

This invention relates to an improved compound and process for the manufacture of artificial stone, marble, or tiles for paving, architectural, and other like purposes; and it has for its objects to provide a compound which may be conveniently molded, and which will be extremely durable and capable of receiving a high polish, and to provide an improved process for forming designs on the surfaces of the slabs or tiles.

In carrying out my invention I take the following ingredients, in about the proportions named, and combine them as more fully hereinafter specified, viz: white shellac, five pounds, dissolved in ether; gum-arabic, five pounds, dissolved in water; oxide of iron, two quarts; oxalic acid, one gallon; spirits of ammonia, one quart; turpentine, one quart; nut-galls, one pound; lime-water, one gallon. The above-mentioned ingredients are mixed with sixty gallons of water, more or less, as occasion may require for inside or outside work. The compound, when required for use, is mixed with Keen's, Portland, or other hydraulic cement in various proportions, according to the nature of the work to be accomplished; or in some instances it may be mixed with white lead or zinc to the consistency of paint and employed as a pigment for coating various articles. For cementing or decorative purposes it may be combined with various mineral or other colors.

In manufacturing my improved slab, in order to produce ornamental surfaces thereon, I proceed as follows: I take a sheet of glass or other material having a smooth surface and place upon the same the design, characters, or figures to be produced upon the surface of the slab, the design, characters, or figures being cut out of sheet metal, pasteboard, or other suitable material. I then take the compound suitably colored and thickened with cement and spatter it upon the portions of the glass left uncovered by the designs by charging a suitable brush with the compound and striking the brush sharply against a rod or other implement held above the surface of the sheet. When the glass has become thoroughly coated and the coating has dried I remove the sheet-metal or other design, leaving a clear space forming its exact counterpart in the material upon the glass, which may be filled in with the compound differently colored and properly thickened, after which the body of the slab may be molded upon the surface thus prepared by employing the compound suitably thickened with cement and tamping it into a properly-shaped frame laid upon the glass.

Instead of spattering the compound upon the glass, a similar effect may be produced by distributing the cement over the slab and pattern by means of a sieve.

The white lead or zinc may be mixed with oil and employed as an impervious coating for the surface of the slab; or the slab may be coated with white or other varnish instead of having its surface finished by polishing. In order to hasten the drying, the surface moisture of the wet slab may be taken up by dry material or cement, the superfluous quantity being afterward brushed off or otherwise removed.

When it is desired to form borders to the slab, or to form a compound slab of different colors, the cement may be laid on the glass in a strip or other desired shape, and after drying the edges are dampened and other strips or shapes in the material differently colored formed against the edges so dampened, which, after drying, forms practically a single slab.

Although I have given the above-named proportions as answering well for general purposes, I do not intend to limit myself specifically to such proportions, as they may be varied considerably without departing from the spirit of my invention.

Having thus described my invention, what I claim, and desire to secure by Letters Patent, is—

1. The compound for the manufacture of artificial stone, marble, tiles, and the like, consisting of shellac dissolved in ether, gum-arabic dissolved in water, oxide of iron, oxalic acid, spirits of ammonia, turpentine, nut-galls, lime-water, water, and Keen's, Portland, or other hydraulic cement, as herein specified.

2. The process herein described of forming designs in the surface of the slab by placing a suitable pattern upon a sheet of glass or other smooth surface and spattering or otherwise distributing the compound upon the same, removing the backing, and filling the space occupied by the said pattern with the compound differently colored, and finally forming the body of the slab on such prepared surface, substantially as specified.

3. The process herein described of forming borders upon the slab or slabs of different colors in one piece by laying the material in strips or other suitable forms, allowing it to become dry, then dampening the edges and building up the remaining parts in the desired colors, substantially as set forth.

In testimony whereof I affix my signature, in presence of two witnesses, this 5th day of December, 1881.

LLEWELLYN L. LEATHERS.

Witnesses:
H. AUBREY TOULMIN,
H. J. ENNIS.